Patented Mar. 19, 1940

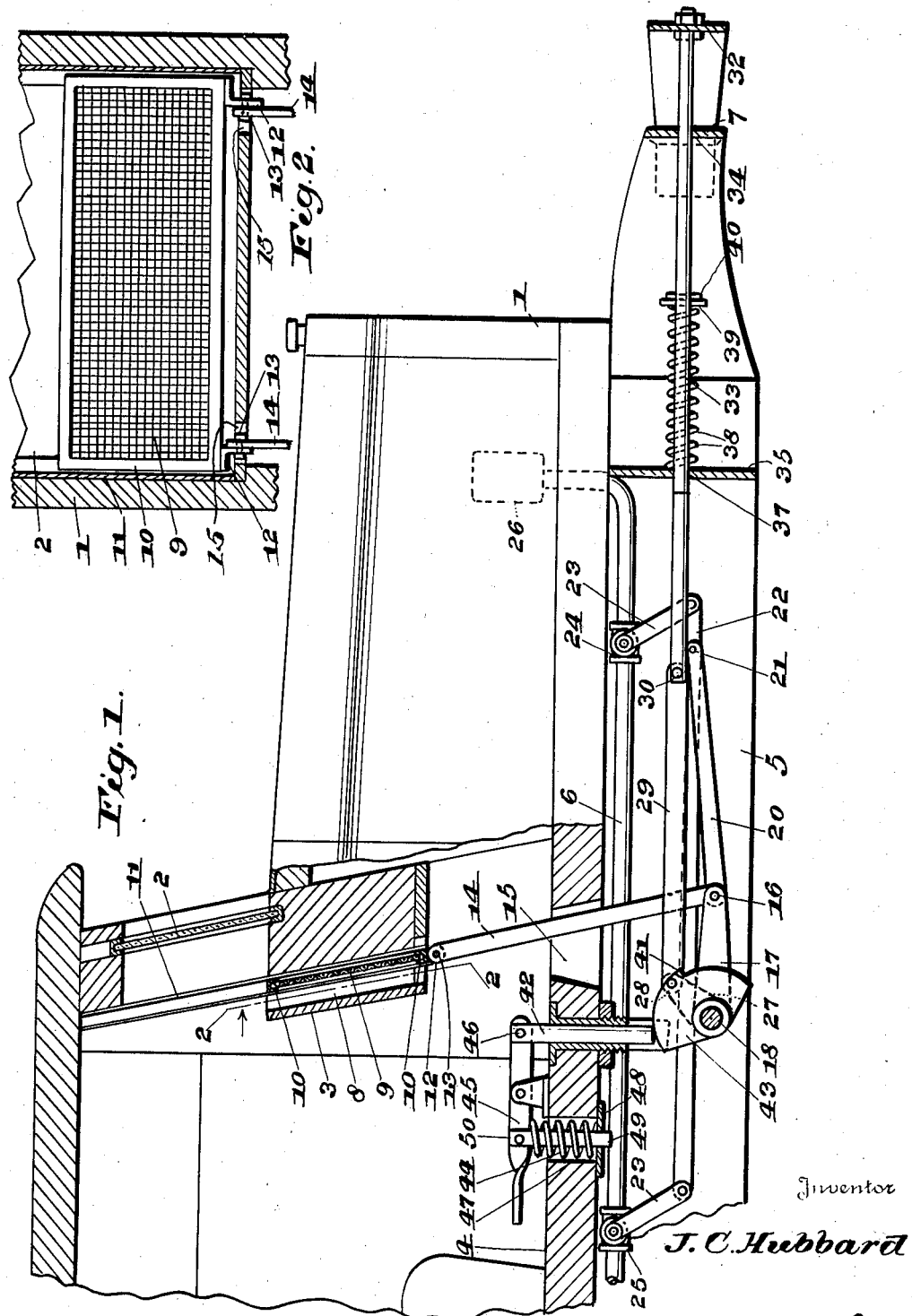

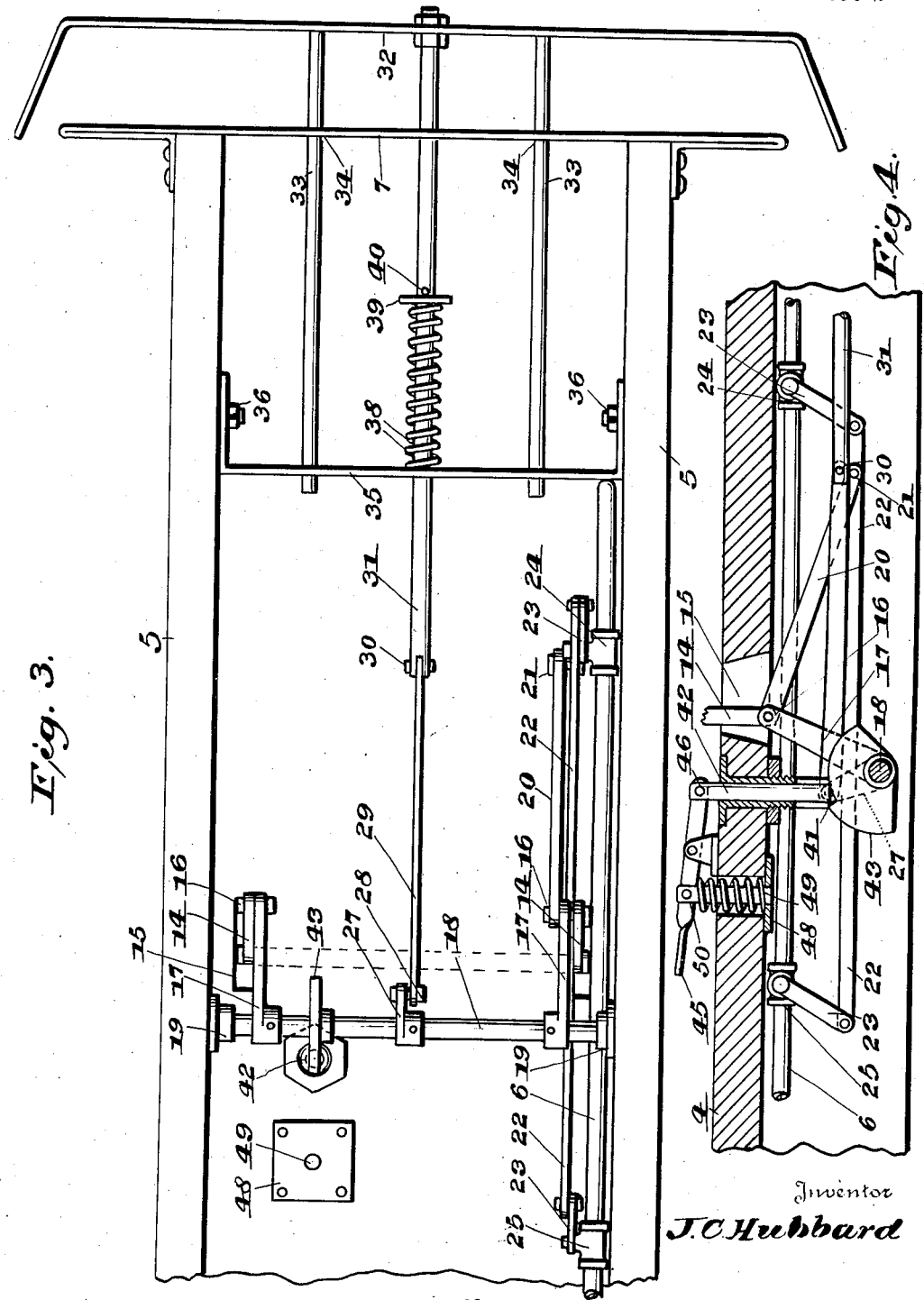

2,194,390

UNITED STATES PATENT OFFICE 2,194,390

MOTOR VEHICLE SAFETY APPARATUS

Joseph C. Hubbard, Clinton, N. C.

Application July 19, 1939, Serial No. 285,402

4 Claims. (Cl. 180—83)

This invention relates to improvements in automotive vehicles, an especial purpose being to incorporate an apparatus which will add a high safety factor in their operation. Said invention is primarily intended for use on passenger automobiles, but from the nature of it, as brought out below, it will readily be understood that it is also applicable to other types of automotive vehicles such as trucks, busses and even aircraft.

The number of lives lost in the course of a year through automobile accidents runs into very high figures. It is acknowledged at the outset that many such accidents are unpreventable because they are the more or less direct result of faulty driving, and automobile accidents will continue to occur until some plan is discovered for eliminating all but highly skilled operators from the road. Many of the accidents in mind have resulted in injury and death of drivers and riders through shattered windshield glass and through burning by the ignited gasoline.

There are many instances on record wherein persons have been pinned to the wreckage and burned to death because no one was able to get near enough to loosen the victim because of the heat of the ignited gasoline. In instances such as these the afflicted person would have been spared his life although maimed had it not been for the added torture of the burning gasoline. It is equally true with respect to broken windshield glass that many victims would have escaped with shocks and jars had it not been for their having been thrown forwardly into the windshield and seriously cut by the resulting broken glass. With this preamble in mind the objects of the invention are as follow:

First, to protect the driver and other persons on the front seat of a motor vehicle which is suddenly stopped in a head-on collision while at a high speed, use then being made of a guard which automatically goes into position between the windshield and said persons to prevent them from being thrown into the windshield to break the glass and becoming severly cut, simultaneously closing the gasoline line and, further, automatically locking the gas line closure and the guard in their stated operative positions until manually released.

Second, to provide an apparatus as described, wherein a single locking means serves the double function of simultaneously securing two valves in a gas line and also the guard in its projected position.

Third, to provide an auxiliary bumper which is in virtually the farthest front position on the motor vehicle so as to be the first part to receive and respond to the heavy impact of a collision, the resulting motion of said bumper in respect to the main bumper furnishing the action for the twin gas line valves, the windshield guard and the latch which locks all in the effective positions.

Other objects and advantages will appear in the following specification, reference being had to the accompanying drawings, in which:

Figure 1 is a partially sectional and elevational view of a portion of an automobile illustrating the safety apparatus in its normal and static condition.

Figure 2 is a section taken on the line 2—2 of Fig. 1 particularly illustrating the slidable guard and its guides.

Figure 3 is an inverted plan view of the structure in Fig. 1, illustrating other details referred to later.

Figure 4 is a fractional sectional view, parts being shown in elevation, particularly illustrating the latch means for holding the linkage after the safety apparatus has been operated.

The automobile generally designated 1 is to be regarded as the equivalent of any one of the types of automotive equipment mentioned before. The known structure on the automobile comprises the windshield 2, the instrument panel 3, the floor 4, the chassis 5, the gas line 6, and the stationary bumper 7. All of these parts may comprise structure of any known design.

The instrument panel 3 occupies a more or less customary position in front of the driver. It is so related to the windshield 2 as to provide an adequate space 8 in which a guard 9 (Fig. 2) is slidable. This guard can be made in any one of a number of ways, for example, of perforated steel or heavy small mesh screen wire. In the latter instance the guard will include a frame 10, the sides of which are slidably mounted in guides 11. These guides are shown as channels, but it would be within the purview of the invention to make them otherwise.

Said guides are located adjacent to the ends of the windshield 2 and are so related thereto as to make the guard 9 workable in the space 8 between the windshield and the instrument panel. The proportions of the parts are such that the guard 9 is virtually hidden by the instrument panel 3 when in its inoperative position, coming into view only when the safety apparatus is set to work.

Lugs 12 (Fig. 2) on the frame 10 provide for the pivotal connection at 13 of the guard with links 14 which reach down through openings 15 in the floor 4 and make pivotal connection at 16 with cranks 17 (Fig. 3) affixed to a cross shaft 18. This shaft is herein known as a common operator means and it is turnably supported in bearings 19 (Fig. 3) that are affixed to the chassis 5.

The pivot 16 between one of the links 14 and its respective crank 17 also provides the mount for a link 20 which extends to a point 21 of pivotal connection to a link 22 which commonly joins the handles 23 of a pair of valves 24, 25 in the gas line 6. The valve 24 is located in the gas line, as closely as possible to the carburetor 26 (Fig. 1). On the same principle the valve 25 is located as closely as possible to the gas supply tank at the rear (not shown). It is the purpose of the twin valves to close off the gas line at the two critical points mentioned in the event of an accident, thus to reduce the escape of gasoline to the lowest possible amount in the event of the breakage of the gas line.

A rocker arm 27 affixed to the cross shaft 18 has a pivotal connection at 28 to a link 29 which extends to a point 30 of pivotal connection with a rod 31 (Fig. 3). This rod is one of a plurality of guide means for an auxiliary movable bumper 32. This bumper is situated an appropriate distance in front of the stationary bumper 7, the spacing usually being about six inches. Other bars 33 complete the guide means for the auxiliary bumper. These bars and the rod 31 are rigidly secured to the auxiliary bumper. They go through holes 34 in the stationary bumper 7 as illustrated in one instance in Fig. 1, the stationary bumper thus aiding in the guiding of the auxiliary bumper when the latter is subjected to movement.

A bridge piece 35 (Fig. 3) spans the distance between the side members of the chassis 5, being secured thereby at 36. The guide means 31, 33 slide in holes 37 (Fig. 1) in the bridge piece 35 and in positions matching the holes 34 in the stationary bumper 7. The auxiliary bumper thus has adequate guidance.

A buffer spring 38 is mounted on the rod 31 (Fig. 3). The bridge piece 35 provides an abutment for one end of the spring. The other end of the latter bears against a washer 39 which is held by a pin 40 going through the rod 31. The buffer spring 38 is intended to be of a predetermined pressure. It is tensioned to respond to fairly light impacts upon the auxiliary bumper 32. The reason for this provision is that it is of foremost importance particularly to extend the guard into its safety position with every potential accident, it being better to throw the guard into its safety position each time the auxiliary bumper 32 encountered some obstruction in the ordinary running of the automobile, than to require an abnormally heavy impact to do this and then run the chance of the apparatus not working because of said impact not being heavy enough. The safety apparatus is set in operation upon the occurrence of a collision and it is held in the operative condition by a locking means which comprises a detent 41 and a latch pin 42 (Fig. 1). Said detent consists of a tooth in a metal segment 43 that is fixedly attached to the cross shaft 18. The point of the latch pin 42 rides a portion of the periphery of the segment, being held there by a spring 44 which acts against a pivoted treadle 45, in turn having the latch pin 42 pivoted thereto at 46. The spring 44 occupies an opening 47 in the floor 4, resting against a plate 48 which has a hole to guide the pin 49 around which the spring is coiled. Said pin is pivoted to the treadle 45 at 50.

Said locking means is described above as one arrangement for carrying out this part of the invention. In actual practice the structure stated does not have to be adhered to strictly. For instance it could be made so that the treadle 45 could be substituted by a button on the floor. This would be simple and neat, and the same principle of modification could be carried out in other parts of the device.

The operation will now be readily understood. The auxiliary bumper 32 is normally spaced forwardly of the stationary bumper 7. The linkage which comprises the various links that are interconnected with each other, as well as with the valve handles 23 and the guard 9, is then so stationed as to hold the valves 24, 25 open and to support the guard 9 in its concealed position.

It will be observed that the rocker arm 27 is considerably shorter than the cranks 17. The result of this arrangement is that a six inch movement, or approximately so, of the auxiliary bumper 32, will produce a movement of the guard 9 twice that extent or approximately so, in any event sufficient to completely cover the windshield 2.

Now when the automobile is involved in an accident, and the auxiliary bumper 32 strikes another automobile, a tree or some other heavy obstruction, the buffer spring 38 will yield to the resulting movement of the auxiliary bumper, said movement being traced back through the linkage. By comparing Figs. 1 and 4 it will be seen that the handles 23 of the valves 24, 25 are shifted to what is to be understood the closed positions of these valves, and that the cranks 17 are erected to positions which can be understood as meaning the displacement of the guard 9 to a shielding position across the windshield 2.

This setting in operation of the guard means occurs immediately upon the yielding of the auxiliary bumper 32 in a collision. The tension of the spring should be light enough that impact with any object would force the movable bumper clear back to the stationary bumper and cause the raising of the guard and the closing of the gas line valves and lock them before the occupants of the vehicle felt the impact. The fundamental idea of the invention is that in case of a collision and in a small fraction of a second before the impact is felt to unseat the occupants of the vehicle, the guard is raised over the windshield, the valves closed and both locked closed. Thus the occupants are saved from being thrown into the windshield and even though the gas line 6 may be broken only an instant afterward the occupants will be protected from fire.

When the foregoing safety function occurs, a motion of the detent 41 corresponding to the motions of the linkage will result in a locking of the shaft 18 by the engagement of the latch pin 42. The locking means thus holds the guard 9 up and the valves 24, 25 closed, and this locking function is regarded as of the utmost importance because after the safety apparatus is once set, it remains set until the treadle 45 or a substitute for it is manually operated to release the detent 41.

In view of what has been stated above it will be apparent that the invention is not intended to be confined to the specific construction and arrangement of parts shown, as these may be varied in detail without departing from the spirit of the invention.

I claim:

1. A motor vehicle having a gas line extending from a supply tank to a carburetor and having a windshield, two valves in said gas line, one near the supply tank and one near the carburetor, a link connecting the valves for working both valves at one time, guides adjacent to the windshield, a guard slidable in the guides but normally stationed to one side of the windshield, a common operator shaft having arms, linkage connecting the arms to the valve link and to the guard, a bumper constituting trigger means having means connecting it to said shaft to turn the shaft, and a buffer spring tending to hold the bumper in a static position preliminarily to a collision, the then resulting displacement of the bumper causing the simultaneous closing of both valves and the extension of the guard across the windshield.

2. In a motor vehicle having a windshield and an instrument panel, guide means situated therebetween and at the ends of the windshield, a guard slidable in the guides, being normally behind the panel and below the windshield, a turnable shaft having a movable connection to the guard, a movable bumper having a movable connection to the shaft, and a buffer spring tending to hold the bumper in a static position preliminarily to a collision, the resulting motion extending the guard in its guides across the windshield.

3. In a motor vehicle having a windshield and an instrument panel, guide means situated therebetween and at the ends of the windshield, a guard slidable in the guides, being normally behind the panel and below the windshield, a turnable shaft having a movable connection to the guard, a movable bumper having a movable connection to the shaft, a buffer spring tending to hold the bumper in a static position preliminarily to a collision, the resulting motion extending the guard in its guides across the windshield, a detent on the shaft, and latch means normally disengaged from the detent but making engagement during said motion to hold the guard extended.

4. A motor vehicle having a rigid bumper and a windshield, a guard for the windshield, a shaft having arms, and links from the arms to the guard normally supporting the guard in a position out of range of the windshield, an auxiliary bumper, plural guide means attached to the auxiliary bumper and having slidable bearing on the main bumper, a movable connection between one of said guide means and said shaft to turn the shaft upon movement of the auxiliary bumper toward the main bumper, and a buffer spring supported at one end on the vehicle frame and having its other end acting upon one of the guide means to hold the auxiliary bumper extended.

JOSEPH C. HUBBARD.